US007722937B2

(12) United States Patent
Chirnomas

(10) Patent No.: US 7,722,937 B2
(45) Date of Patent: May 25, 2010

(54) SEPARABLE PACKAGING AND LAYERING MACHINE THEREFORE

(76) Inventor: Munroe Chirnomas, 47 Skyline Dr., Morris Township, NJ (US) 07960

( * ) Notice: Subject to any disclaimer, the term of this patent is extended or adjusted under 35 U.S.C. 154(b) by 1133 days.

(21) Appl. No.: 10/560,218

(22) PCT Filed: Jun. 9, 2004

(86) PCT No.: PCT/US2004/018434

§ 371 (c)(1),
(2), (4) Date: Dec. 9, 2005

(87) PCT Pub. No.: WO2004/113096

PCT Pub. Date: Dec. 29, 2004

(65) Prior Publication Data

US 2006/0127614 A1 Jun. 15, 2006

(51) Int. Cl.
*B29D 22/00* (2006.01)
*B29D 23/00* (2006.01)
*B32B 1/08* (2006.01)

(52) U.S. Cl. .................... 428/35.4; 428/35.2; 428/35.7; 428/36.6; 428/36.7; 426/108; 426/120; 426/124; 426/126; 426/127

(58) Field of Classification Search ................ 428/35.2, 428/35.4, 34.1, 35.7, 36.6, 36.7, 36.9, 36.91; 426/108, 119, 120, 121, 124, 126, 127
See application file for complete search history.

(56) References Cited

U.S. PATENT DOCUMENTS 4,128,049 A * 12/1978 Lehmacher ................. 493/194
4,133,896 A 1/1979 Standing et al.
4,143,165 A 3/1979 Daswick
4,653,685 A 3/1987 Leary et al.
4,844,330 A 7/1989 Roosa
4,874,618 A 10/1989 Seaborne et al.
4,974,747 A 12/1990 Ahlstrom
5,012,971 A 5/1991 Cozzi
5,052,553 A 10/1991 De Sanctis
5,213,256 A 5/1993 Cyr
5,400,699 A 3/1995 Cailbault
5,473,866 A 12/1995 Maglecic et al.
5,676,244 A 10/1997 Green
5,718,933 A 2/1998 Fultz
5,804,265 A * 9/1998 Saad et al. ................. 428/35.2
5,863,578 A 1/1999 Guarino
6,062,468 A 5/2000 Tausanovitch
6,602,528 B1 8/2003 Wells
6,802,433 B2 10/2004 Leykin et al.
6,951,272 B2 10/2005 Galdos
2002/0176914 A1 11/2002 Kimball et al.
2003/0003200 A1 1/2003 Bukowski
2003/0161915 A1 8/2003 Lenahan

* cited by examiner

*Primary Examiner*—Michael C Miggins
(74) *Attorney, Agent, or Firm*—Lawrence C. Edelman

(57) ABSTRACT

In accordance with one aspect of the invention, a material, such as a plastic film, is used to separate independent food elements. The independent food elements and the separation material are packaged together using a unifying outer package. At a point in time when the customer decides to eat the food, the outer package is opened and the film that separates the different food elements is removed, either manually or automatically. This marks the first point in time that the separate elements come into contact with each other. Therefore, the food product is maintained at the highest level of integrity until the time of usage by the customer. Methods and a machine for layering the contents of the packages so as to form a completed assembly for the packaged elements is also described.

9 Claims, 6 Drawing Sheets

SEPARABLE PACKAGING AND LAYERING MACHINE THEREFORE

BACKGROUND OF THE INVENTION

1. Field of the Invention

The present invention relates to separable packaging and methods and a machine for dispensing the contents of separable packages, preferably in a layered manner. More specifically, it relates to packaged food products such as sandwiches or other foods that have at least two independent elements such as cheese, meats or vegetables, or other food related items having related elements, such as spaghetti and tomato sauce, a salad and a salad dressing, or even the forenoted spaghetti and tomato sauce and a bowl for holding the just combined spaghetti and sauce,. The invention also relates to methods and a machine for dispensing the contents of separable packages, preferably in a layered manner, so as to form a completed assembly for the dispensed contents of the packages. The present invention is particularly advantageous for automated machine preparation and vending of multi-element food products.

2. Background Information and Description of the Related Art

Currently, foods such as these are often packaged fully assembled, in which case the separate elements come into contact with other elements at the time the contents of the packages are assembled. For example, in the case of a simple cheese sandwich, the cheese will contact the bread and after a period of time, the bread will soak up the moisture from the cheese and the bread will become soggy, leading to a lower quality product and a degradation of textures. In the case of tomato sauce mixed together with the pasta at the point in time when and where it is packaged, the pasta can soak up the moisture from the tomato sauce and the texture and taste will degrade. Existing methods of layering food products include doing it by hand, as is done every day at any restaurant, or by automated machinery which may dispense out of a bulk storage area. These methods require that various portions of the ingredients are exposed to ambient air and other environment conditions during handling and storage time until all of the ingredients are used up when making the finished products are thrown away due to dating or spoilage. In addition, the kitchen or environment where the elements are layered and the objects or hands that contact the food elements are difficult to keep sanitized at all times. Freshness and sanitary conditions are a key concern. Additionally, spoilage and labor requirements are other issues that must be taken into account.

SUMMARY OF THE INVENTION

In accordance with one aspect of a preferred embodiment of the present invention, a material, such as a plastic film, is used to separate independent food elements that may be used to form a more complex, i.e., multi-element, food item. The independent food elements and separation material are packaged together using a unifying outer package. The outer package can be vacuum-sealed so as to help maintain the freshness and provide significant shelf-life for the food items. At the point in time when a customer decides to eat the food, the outer package is opened and the film that separates the different food elements is removed, either manually or automatically. This marks the first point in time that the separate elements come into contact with each other. Therefore, the individual food elements are maintained at the highest level of integrity until the time of usage by the customer.

In accordance with further aspects of the present invention, the separation material can be part of or attached to the outer package and the outer package can be opened by use of a pull-strip that can divide the package into two separate halves.

Furthermore, with separable packaging having these aspects, a package opening machine may be used to automatically pull the pull-strip to separate the outer package. Then, the package opening machine may apply pressure on the outer package as the two halves of the outer package are pulled apart, so that the food contents in the package do not move with respect to one another, yet allow the separation material to be removed by sliding out from between the food elements, thereby allowing the separated food elements to finally come into contact with each other.

In one embodiment of the present invention, there can be a primary food element such as a piece of bread or a quantity of pasta that can be resting on a sanitary substrate surface such as a plastic film or a bowl. In one embodiment of the invention this primary food element can be packaged in a vacuum-sealed plastic film pouch along with the respective sanitary substrate surface, and both can be dispensed out of the pouch onto a preparation surface that is positioned adjacent to the package opening mechanism. The sanitary preparation surface can be stationary, or can move to multiple positions, such as with a conveyor, a rotary table or a moving platform. The primary food element, such as the forenoted piece of bread, can be positioned on the sanitary substrate surface and adjacent to the package opening mechanism. When the package opening mechanism dispenses a second food element out of a further pouch, the second food element is positioned on top of the primary food element. These steps can be repeated multiple times until the desired layering process results in a completed assembly of the food product. The ability of the preparation surface to move as described above enables the various ingredients and respective pouches to be positioned at specific locations, and the food elements can travel on the preparation surface to a point adjacent to the vacuum-sealed pouch of the next ingredient desired to be layered.

In an alternate embodiment, the pouches can be moved to a common station where they are automatically opened and dispensed in a desired sequence, and thereby layered one on top of another. In an even further embodiment, multiple package opening mechanisms can be positioned adjacent to a common moving or fixed preparation surface, and one or more of the package opening mechanisms can contribute to the layering process for making the final food product.

In a preferred embodiment, successive ones of the pouches can be connected together in a continuous fashion by forming them out of at least two lengths of plastic packaging film and connected one to the other in a manner that enables each pouch to be separately opened. In accordance with one aspect of the invention, such separable opening of each pouch can be provided by a roller mechanism having a respective one of two roller connected to each of the at least two layers of film that form the outside layers of the food element pouch. The film is wound around the rollers, so that as the rollers wind the film up, the pouch is thereby separated/opened, and the product in the pouch is ejected or dispensed from the pouch. In this way many elements can be layered in a sanitary and fresh manner without the need for human contact, and while dramatically reducing the costs and health risks of spoilage. Alternatively, the packages can be provided one at a time to the package opening machine.

DETAILED DESCRIPTION OF THE INVENTION

Figure 1:
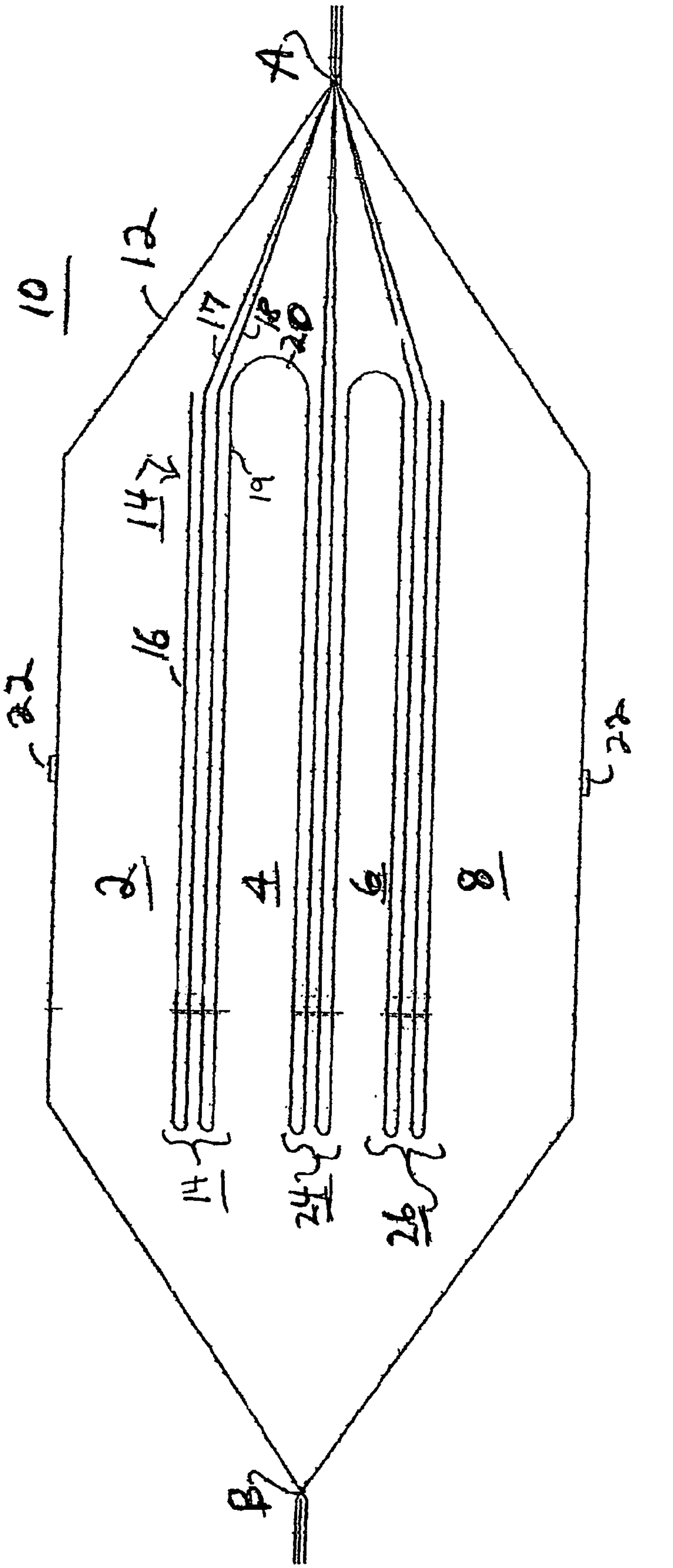
FIG. 1 illustrates one embodiment of the inventive packaging.

FIG. 1 illustrates a separable package 10 for containing therein various independent elements, such as food elements. The package 10 comprises an outer package barrier 12 that completely seals therein the various independent elements (the various independent elements not being shown in FIG. 1, and an inner divider arrangement 14. In the FIG. 1 embodiment, divider arrangement 14 comprises a continuous web or film of material, such as a sheet of plastic, which is folded so as to provide a physical separation between layered areas or zones 2, 4, 6 and 8 inside package barrier 12. More specifically, divider arrangement 14 is show in FIG. 1 as comprising a continuous web of film that starts at layer 16 near an end A of package 10, extends to an opposed side B of package 10, folds back on itself as layer 17, and then becomes attached to side A. It then extends out from side A toward side B as layer 18, and then folds back on itself as layer 19. Since there are to be other elements inside package 10 that need separation, a curved section 20 is formed at the end of layer 19 near end A, so that layer 19 makes a 180 degree turn back towards end B. The arrangement of layers 16-19 is then repeated, so as to form layered film divider arrangements 24 and 26. Thus, as shown in FIG. 1, by repeating this process the four separate layered zones 2, 4, 6 and 8 are established.

It is noted that package barrier 12 is easily separable into two parts using any of several well know techniques, such as, for example, including in barrier 12 a "pull/tear strip" 22 that surrounds package 12, or by using a line of perforations in the material forming package barrier 12, such that pulling at the opposed ends A and B of the package 10 cause the barrier material 12 to separate along the perforations.

Package 10 can be used to contain therein food elements useful for making a more complex food creation, such as a sandwich, for example, in which case the separate zones can be used to hold:

a. Deli meats b. Cheeses c. Vegetable ingredients (such as lettuce, tomato, pickles, onions, olives, etc.)

d. Bread products (such as sliced rolls, bagels, pita bread, rye bread, etc)

e. Liquid condiments (such as ketchup, mayonnaise, oil and vinegar, etc.)

In accordance with a further aspect of this invention, when one of the layers is to hold an element having a high liquid content, that layer could be replaced with a separable sealed pouch in place of a divider arrangement such as layers 16-19. In this case, the separable pouch, not shown, would be similar to package barrier 12, but smaller, and placed inside one of the zones, such as zone 4. The opposed ends of the pouch could be secured to the opposed ends A and B of package 10, and a portion near the center of the pouch, or along the length of the pouch, could be perforated or have a flap sealing an opening, so that upon separation of package barrier 12, the internal pouch having the high liquid content becomes separable or un-sealed and its contents are spilled or otherwise allowed to contact the food elements positioned in zones of the package 10 that are adjacent thereto.

Figure 2:
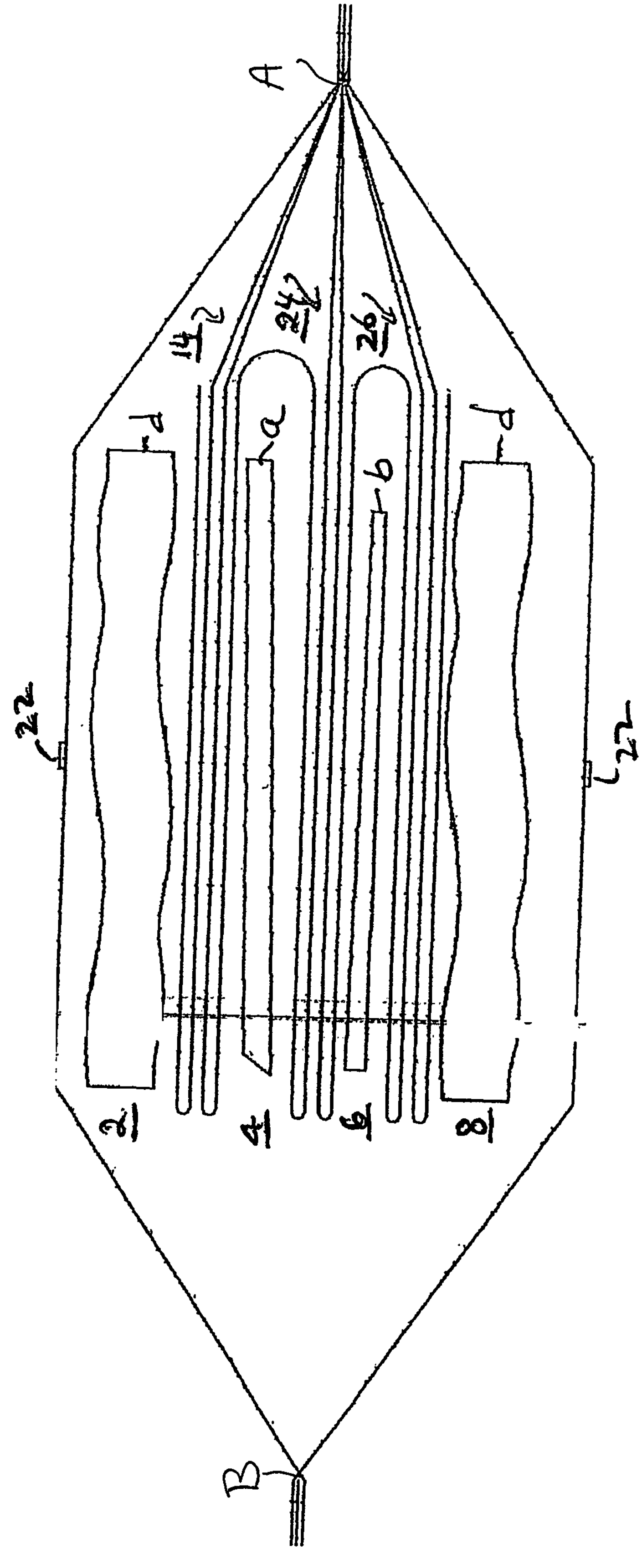
FIG. 2 illustrates the FIG. 1 embodiment with food elements packaged therein.

FIG. 2 illustrates food elements positioned in the FIG. 1. package for making a sandwich, where zones 2, 4, 6, and 8 may hold a respective food element d, a, b and d, for example, of the above list. May variations are possible, such as more or less separable zones, and the use of one or more internal separable sealed pouches for high liquid or other food elements for which a more complete isolation of that food element is desirable until the final assembly of the multi-element food item.

In operation, the package with the food elements and divider arrangements therein, can be fabricated using standard and conventional food handling and packaging equipment. It may also be desirable to vacuum seal package barrier 12, as well as any internal pouches that may be included therein. To open the package barrier 12, the pull strip 22 is used to separate the package 10 into two halves when the ends A and B are pulled apart. As they are pulled apart and package barrier 12 separates, layers 17 and 18 are withdrawn from between layers 16 and 19 that are adjacent to adjacent ones of the food elements, and as they are withdrawn, layers 16 and are also withdrawn, until the divider arrangement 14 is completely removed and no longer separates the food elements in zones 2 and 4.

This arrangement where layers 17 and 18 slide against adjacent layers 16 and 20 during dispensing of the food elements contained therein, is particularly advantageous since the plastic layers can more easily slide with respect to one another as compared with sliding against a food element. Additionally, in accordance with another aspect of the invention, an food grade lubricant can be used inside package 10 so as to further assist with the dispensing of the food elements so that the food elements don't stick to the film layers as package 10 is being separated.

Figure 3:
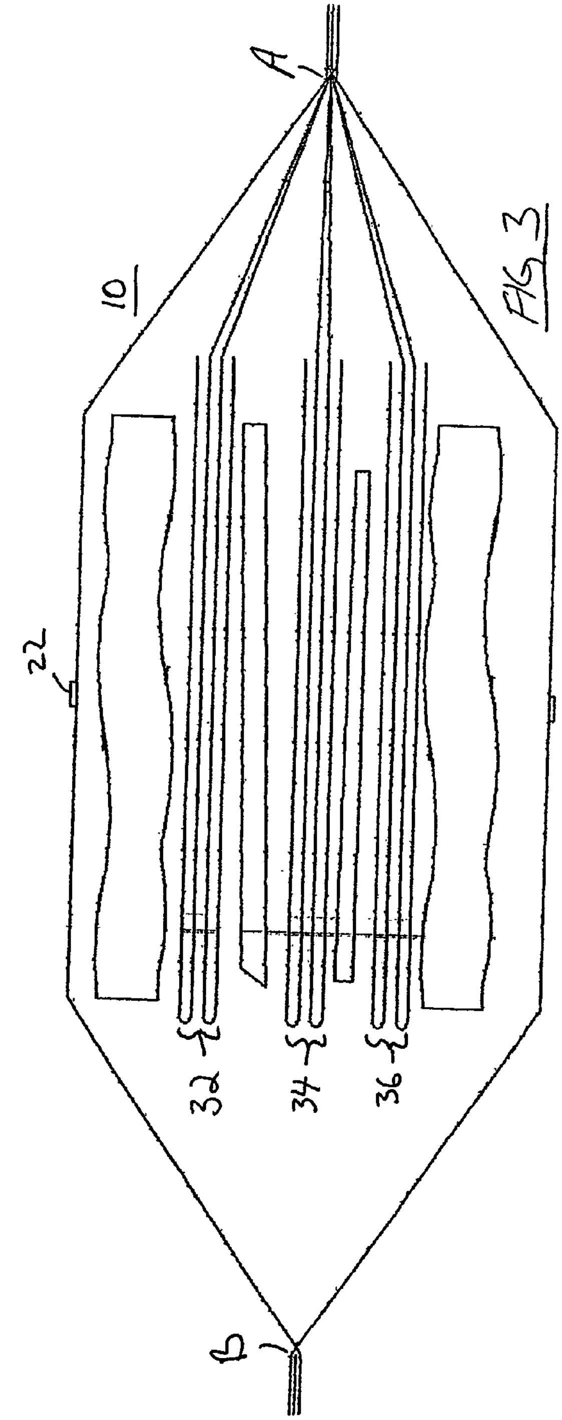
FIG. 3 illustrates a further embodiment of the inventive packaging.

It is noted that there are many different ways to accomplish the function provided by the FIG. 1 embodiment. For example, instead of using a continuous folding film to form the divider arrangement which makes zones 2-8, each divider arrangement 14, 24 and 26 could be formed using separately folded arrangements 32, 34, and 36, such as shown in FIG. 3.

Figure 4:
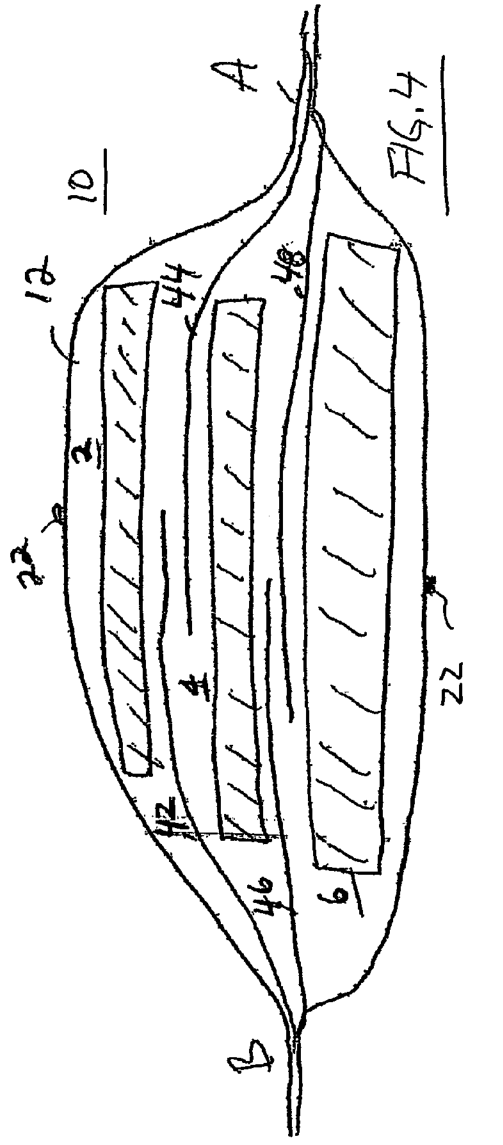
FIG. 4 illustrates an even further embodiment of the inventive packaging.

Additionally, one could form the divider arrangement by attachment of the film which forms the layers of the divider to both of ends A and B of package barrier 12, instead of just at end B. An example of this embodiment is shown in FIG. 4, wherein overlapping film/sheets 42/44 and 46/48 extend from the opposed ends of package 10 to form a divider arrangement to make zones 2, 4, and 6. In operation, package separation can be accomplished using the pull strip 22 as in the previously described embodiment, so that as the opposed ends A and B are pulled apart, sheets 42 and 46 stay with end B, while sheets 44 and 48 stay with end A, thereby allowing the food elements from zones 2, 4, and 6 to contact each other and form the completed food product.

In further alternative embodiments, it may be desirable for the food elements in the package to be heated before being served to the user, in which case a microwave oven can be used to heat the contents of the package before it is opened, or the contents could be heated after the package has been opened and the food elements have already been brought together.

In an even further embodiment, it is not necessary that each zone in the package have a food element stored therein, and instead have a food related item. For example, in one embodiment of the invention, a lower zone could contain a bowl, a zone above that zone contain pasta, and a top zone contain an openable pouch with sauce.

Figure 5:
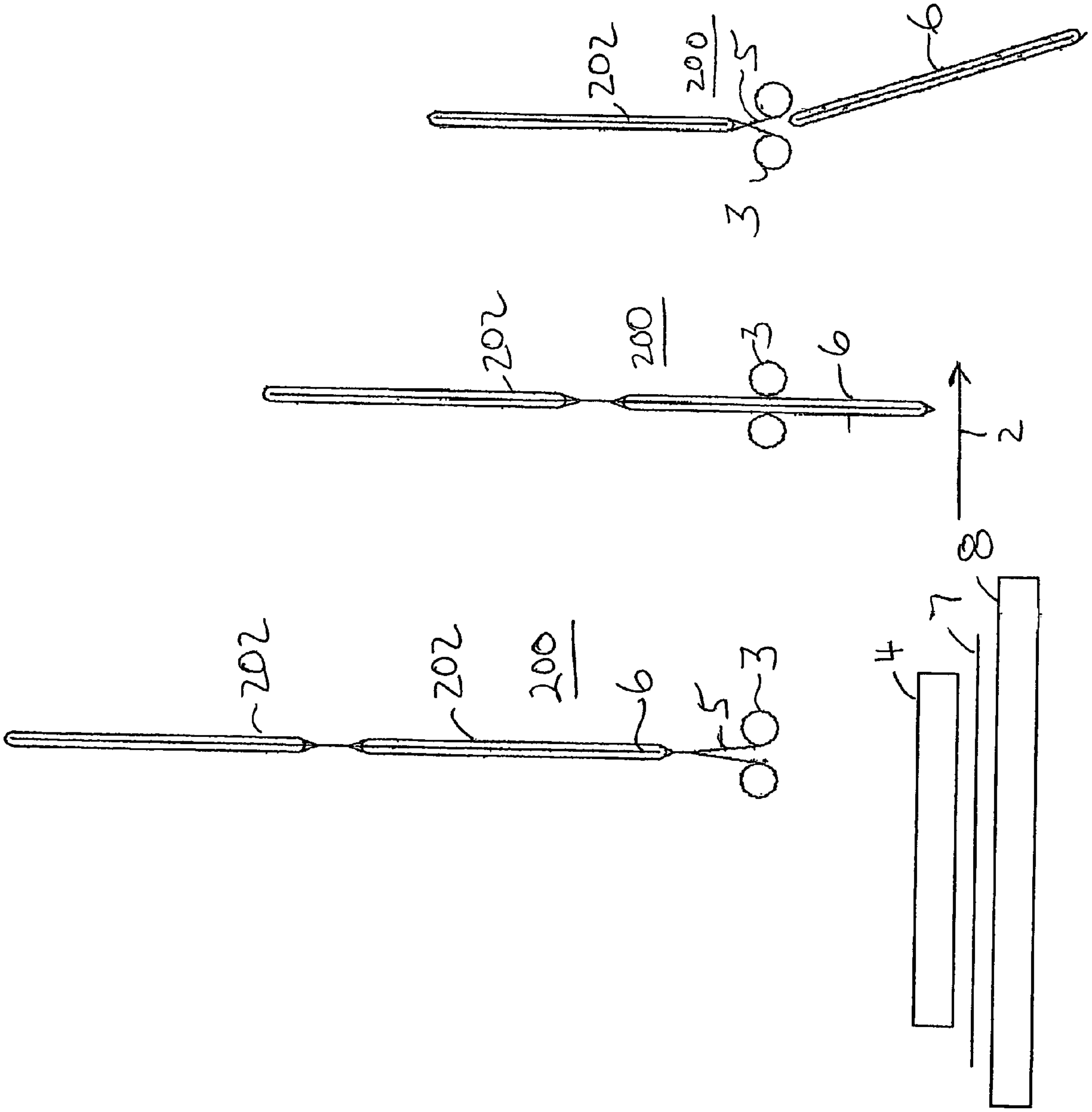
FIG. 5 shows a layering machine which uses separable packing, where the separable packages are oriented vertically with respect to a moving preparation surface.

FIGS. 5, 6 and 7 will now be described, which show various orientations between a machine which opens separable packages and a primary substrate onto which products in the separable packages are dispensed during the preparation of the layered product. It is noted that the separable packages in the following description may not necessarily be the same as the separable packages 10 shown in FIGS. 14, and in fact in one embodiment may merely comprise a pouch formed by sealing together opposed ends of a two adjacently positioned rectangular sheets of a plastic film.

More specifically, in FIG. 5 a stationary layering machine 200 provides the separable packages 202 vertically with respect to a preparation surface 8 that moves in the direction of arrow 2. In FIG. 6 the preparation surface 8 moves concurrently with the pouch as it is being dispensed by the layering machine 200, and in FIG. 7 the preparation surface 8 is stationary with respect to the pouch dispensing operation of the layering machine 200.

In FIG. 5, package 202 includes a food element 6 packaged in a plastic film 5. The film 5 is wrapped around rollers 3 and when the rollers turn in opposing directions relative to each other, the food element 6 is ejected out of the pouch and is positioned, for example, onto a primary food element 4 which is resting on a sanitary film substrate 7. Film substrate 7 is resting on preparation surface 8.

Figures 6A, 6B, 6C:
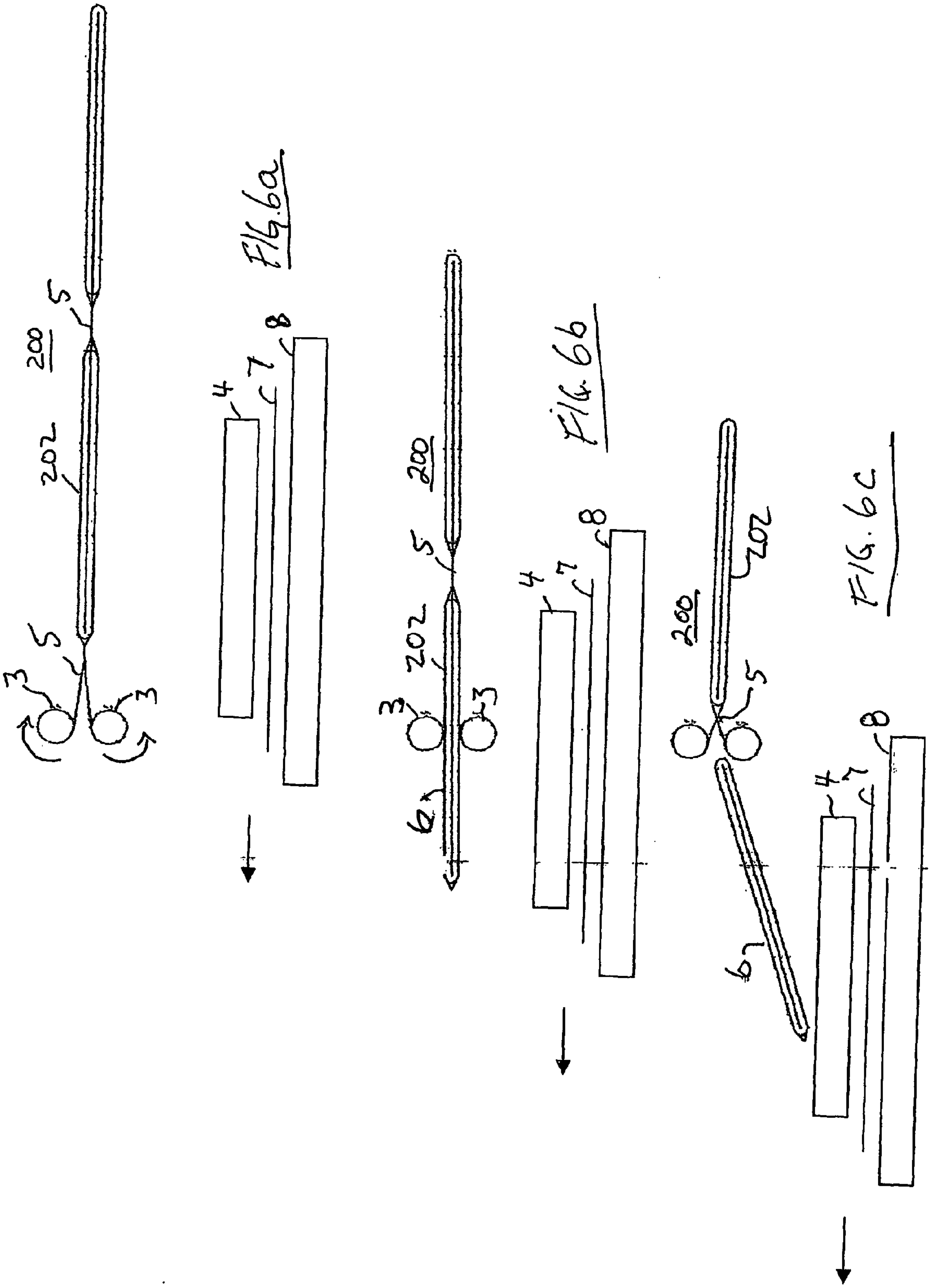
FIGS. 6*a*, 6*b*, and 6*c* show the preparation surface moving concurrently with the dispensing operation of the layering machine.
Figures 7A, 7B, 7C:
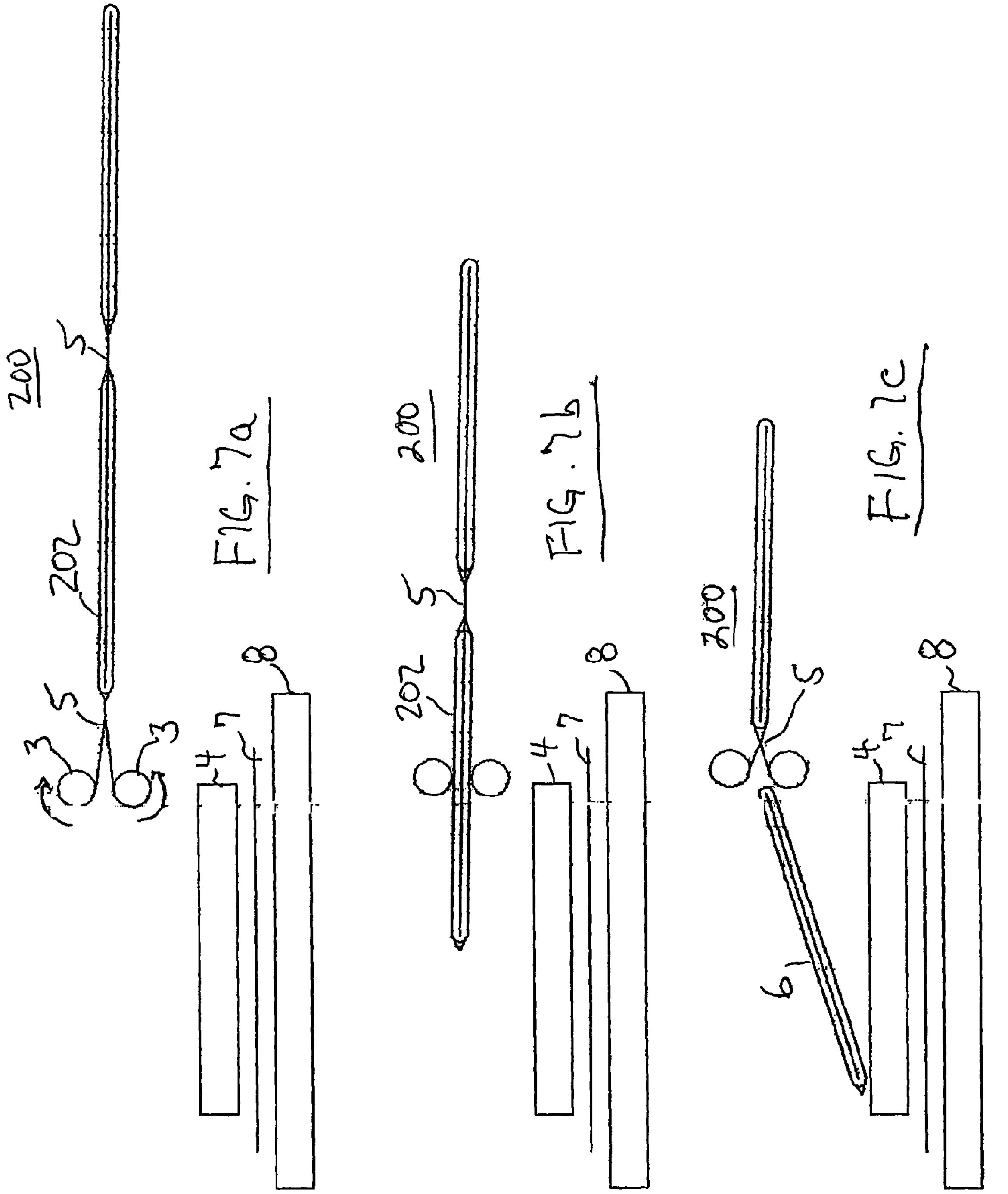
FIGS. 7*a*, 7*b*, and 7*c* show the dispensing operations of the layering machine with a stationary preparation surface.

In FIGS. 6*a*, 6*b* and 6*c*, a package 202 includes a food element 6 packaged in a plastic film 5. The film 5 is wrapped around rollers 3 and when the rollers turn in an opposing directions relative to each other, the food element 6 is ejected out of the package 202 and is positioned onto the primary food element 4 which is resting on a sanitary film substrate 7. Film substrate 7 is resting on preparation surface 8.

As noted above, in FIGS. 7*a*, 7*b*, and 7*c*, the preparation surface 8 is stationary with respect to the food element dispensing operation of the layering machine 200.

The system can be housed in a housing such as a vending machine, a tabletop box for store use or out in the open in the case of a kitchen. A control system can be linked to the dispensing mechanism so that a customer can customize the food elements that are layered. The entire process can be open to viewing through a window or port. The unit can also receive payments and be responsive to customer inputs. The system can also be utilized for non food products.

The pouches can contain food elements such as vegetables, cheese, meat, bread and liquids such as condiments and sauces.

The pouches can be stored in a accordion fashion, folded back and forth against one another, or can be stored in a roll or simply one pouch at a time separated from the others.

If the pouch is made of a foil material, the pouch can be transferred into a cooking environment, such as a clam shell hot cooking press which can for example, cook an uncooked burger or filet prior to the food element being dispensed.

If the pouch is plastic film, the food element can be cooked in various manners including using microwave technology prior to being dispensed and positioned onto another element.

The food elements can also be cooked automatically after they are layered and before being dispensed through a vending machine port, such as in the case of pizza.

It is intended that the present invention not be limited to the described embodiments, but that it has the full scope as defined by the above descriptions and alternatives, as well as equivalents thereof. It should be realized that none of the food items could also be packed using this invention.

The invention claimed is:

1. A separable pouch for containing food items therein, comprising:

a pouch having opposed ends and first and second barrier sheet members positioned one on top of another for forming said pouch therebetween, a portion of said first and second barrier sheet members positioned between said opposed ends of the pouch including a separation structure, said separation structure functioning to allow said pouch to separate into at least two pieces, each piece including one of said first and second opposed ends of the pouch when said separation structure is activated, and further including additional barrier sheet members positioned inside the pouch for keeping food items stored between the additional sheet members from coming in contact with each other while inside the pouch, thereby creating separation zones inside the pouch for holding food items, and wherein, said additional barrier sheet members are connected to at least one of said opposed ends of the pouch, so that when the ends of said pouch are separated, said additional barrier sheet members remain connected to said at least one end of the pouch, thereby removing the separate zones between the food items inside the pouch.

2. The separable pouch of claim 1, wherein at least one of said additional barrier sheet members comprises at least two further sheet barrier members, each of the further barrier sheet members extend inside the pouch from one opposed end toward the other opposed end.

3. The separable pouch of claim 1, further including:

a machine for automatically opening a plurality of the separable pouches for forming a layered product of food elements as each of said pouches is separated.

4. The separable pouch of claim 1, wherein at least one of said additional barrier sheet members comprises a further barrier sheet member that starts at a point connected to one end of the pouch and extends inside the pouch toward the other end of the pouch to a point that establishes a distal end for a separation zone created thereby, said further barrier sheet member then folds back on itself and ends near the one end of the pouch.

5. The separable pouch of claim 4, wherein two further barrier sheet members, each folded back on itself, are positioned one on top of another, for defining one side of a separation zone inside said pouch, said folded back on each other two further barrier sheet members forming four barrier sheet members, where the two inside barrier members are connected to the one end of the pouch.

6. The separable pouch of claim 5, wherein the further barrier sheet member which forms a bottom of one separation zone extends inside the pouch so as to form a top barrier sheet member for a separation zone that is positioned thereunder.

7. The separable pouch of claim 1, wherein said separation structure is connected to a portion of said first and second barrier sheet members which form said pouch, between said opposed ends of the pouch.

8. The separable pouch of claim 7, wherein said separation structure comprises a weakness built into the first and second barrier sheet members, so that when the opposed ends are pulled in opposite directions, said pouch separates into at least two portions.

9. The separable pouch of claim 8, wherein said weakness is formed by perforations in said first and second barrier sheet members.

* * * * *